(12) United States Patent
Shin et al.

(10) Patent No.: US 12,475,832 B2
(45) Date of Patent: Nov. 18, 2025

(54) DISPLAY DEVICE

(71) Applicant: LG Display Co., Ltd., Seoul (KR)

(72) Inventors: Beomjun Shin, Goyang-si (KR); Gyeongho Ryu, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/420,460

(22) Filed: Jan. 23, 2024

(65) Prior Publication Data
US 2024/0257700 A1 Aug. 1, 2024

(30) Foreign Application Priority Data
Jan. 31, 2023 (KR) .................... 10-2023-0013257

(51) Int. Cl.
G09G 3/3208 (2016.01)
G09G 3/20 (2006.01)

(52) U.S. Cl.
CPC ......... G09G 3/2096 (2013.01); G09G 3/3208 (2013.01); G09G 2300/0814 (2013.01); G09G 2300/0819 (2013.01); G09G 2300/0857 (2013.01); G09G 2370/00 (2013.01)

(58) Field of Classification Search
CPC ............... G09G 3/2096; G09G 3/3208; G09G 2300/0814; G09G 2300/0819; G09G 2300/0857; G09G 2370/00; G09G 2310/061; G09G 2370/04; G09G 2370/08; G09G 2370/10; G09G 3/3291
See application file for complete search history.

(56) References Cited

U.S. PATENT DOCUMENTS

| 5,592,633 A * | 1/1997 | Casis ................ G06F 13/4068 710/315 |
| 5,878,234 A * | 3/1999 | Dutkiewicz ............ H04L 12/40 710/110 |
| 6,038,400 A * | 3/2000 | Bell .................... G06F 13/4291 710/16 |
| 7,984,214 B2 * | 7/2011 | Heizmann ................ G06F 1/10 713/401 |

(Continued)

FOREIGN PATENT DOCUMENTS

CN 102063358 A * 5/2011
JP H11312967 A * 11/1999

(Continued)

Primary Examiner — Temesghen Ghebretinsae
Assistant Examiner — Karin Kiyabu
(74) Attorney, Agent, or Firm — Seed Intellectual Property Law Group LLP

(57) ABSTRACT

The present disclosure relates to a display device. A display device according to an exemplary embodiment of the present disclosure includes a display panel in which a plurality of pixels is disposed, a timing controller which generates and outputs drive signals required to drive the display panel, a first communication line which is electrically connected between the timing controller and a first memory and is electrically connected to an external device, a second communication line which is connected between the timing controller and a second memory and is electrically connected to the external device and a line controller which controls whether to use the second communication line depending on whether the first communication line is used.

12 Claims, 6 Drawing Sheets

(56) References Cited

U.S. PATENT DOCUMENTS

| | | | | |
|---|---|---|---|---|
| 8,495,270 | B2* | 7/2013 | Maruko | G06F 1/10 |
| | | | | 710/305 |
| 8,959,274 | B2* | 2/2015 | Le Goff | G06F 13/364 |
| | | | | 710/316 |
| 9,411,772 | B2* | 8/2016 | Jones | G06F 3/061 |
| 9,436,647 | B2* | 9/2016 | Low | G06F 13/4282 |
| 10,007,631 | B2 | 6/2018 | Park et al. | |
| 12,132,810 | B2* | 10/2024 | Brouse | H04L 69/14 |
| 12,321,308 | B2* | 6/2025 | Wang | G06F 9/30101 |
| 2002/0108011 | A1* | 8/2002 | Tanha | G06F 13/4291 |
| | | | | 710/306 |
| 2004/0010728 | A1* | 1/2004 | Musumeci | H03K 5/1252 |
| | | | | 713/400 |
| 2009/0121997 | A1* | 5/2009 | Jo | G09G 3/20 |
| | | | | 345/99 |
| 2009/0146711 | A1* | 6/2009 | Senda | G09G 3/2096 |
| | | | | 327/158 |
| 2013/0205054 | A1* | 8/2013 | Wright | G06F 1/24 |
| | | | | 710/105 |
| 2015/0363353 | A1* | 12/2015 | Enami | G06F 1/08 |
| | | | | 710/110 |
| 2016/0321208 | A1* | 11/2016 | Park | G06F 12/0246 |

FOREIGN PATENT DOCUMENTS

| | | |
|---|---|---|
| KR | 20160128538 A | 11/2016 |
| KR | 101906310 B1 | 10/2018 |

\* cited by examiner

DISPLAY DEVICE

CROSS-REFERENCE TO RELATED APPLICATIONS

This application claims the priority of Korean Patent Application No.10-2023-0013257 filed on Jan. 31, 2023, in the Korean Intellectual Property Office, the disclosure of which is incorporated herein by reference.

BACKGROUND

Technical Field

The present disclosure relates to a display device, and more particularly, to a display device which is capable of reducing or minimizing a noise of a communication line.

Description of the Related Art

Currently, as it enters a full-scale information era, a field of a display device which visually expresses electrical information signals has been rapidly developed and studies are continued to improve performances of various display devices such as thin-thickness, light weight, and low power consumption.

A representative display device may include a liquid crystal display (LCD) device, a field emission display (FED) device, an electro-wetting display (EWD) device, an organic light emitting display (OLED) device, and the like.

Among them, the organic light emitting display device is a self-emitting display device so that a separate light source is not necessary, which is different from the liquid crystal display device. Therefore, the organic light emitting display device may be manufactured to have a light weight and a small thickness. Further, since the organic light emitting display device is advantageous not only in terms of power consumption due to the low voltage driving, but also in terms of color implementation, a response speed, a viewing angle, and a contrast ratio (CR), it is expected to be utilized in various fields.

BRIEF SUMMARY

Various embodiments of the present disclosure provide a display device which reduces or minimizes erroneous transmission of a data voltage due to an external noise when a data voltage is compensated for pixel compensation.

Various embodiments of the present disclosure provide a display device which reduces or minimizes a noise when two communication lines connected to an external device are used.

Technical benefits of the present disclosure are not limited to the above-mentioned benefits, and other benefits, which are not mentioned above, can be clearly understood by those skilled in the art from the following descriptions.

A display device according to an exemplary embodiment of the present disclosure includes a display panel in which a plurality of pixels is disposed, a timing controller which generates and outputs control signals required to drive the display panel, a first communication line which is connected between the timing controller and a first memory and is connected to an external device, a second communication line which is connected between the timing controller and a second memory and is connected to the external device and a line controller which controls whether to use the second communication line depending on whether the first communication line is used.

A display device according to another exemplary embodiment of the present disclosure includes a display panel; a timing controller configured to generate a control signal required to drive the display panel; a first communication line via which the timing controller is connected with an external device; a switch; a second communication line via which and the switch the timing controller is also connected with the external device; and a line controller configured to, when determining that the first communication line is in use, output a control signal to the switch such that the switch is turned off.

Other detailed matters of the exemplary embodiments are included in the detailed description and the drawings.

According to the present disclosure, when the data voltage is compensated using a communication line connected to the external device for pixel compensation, if a communication line is not used, the communication line is open so that a signal is not input through the communication line. Accordingly, transmission of a wrong data voltage due to the external noise may be reduced or minimized.

According to the present disclosure, when an I2C communication line connected to an external device and an SPI communication line are used in a timing controller, if the I2C communication line is used, the display device opens the SPI communication to reduce or minimize the communication noise.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
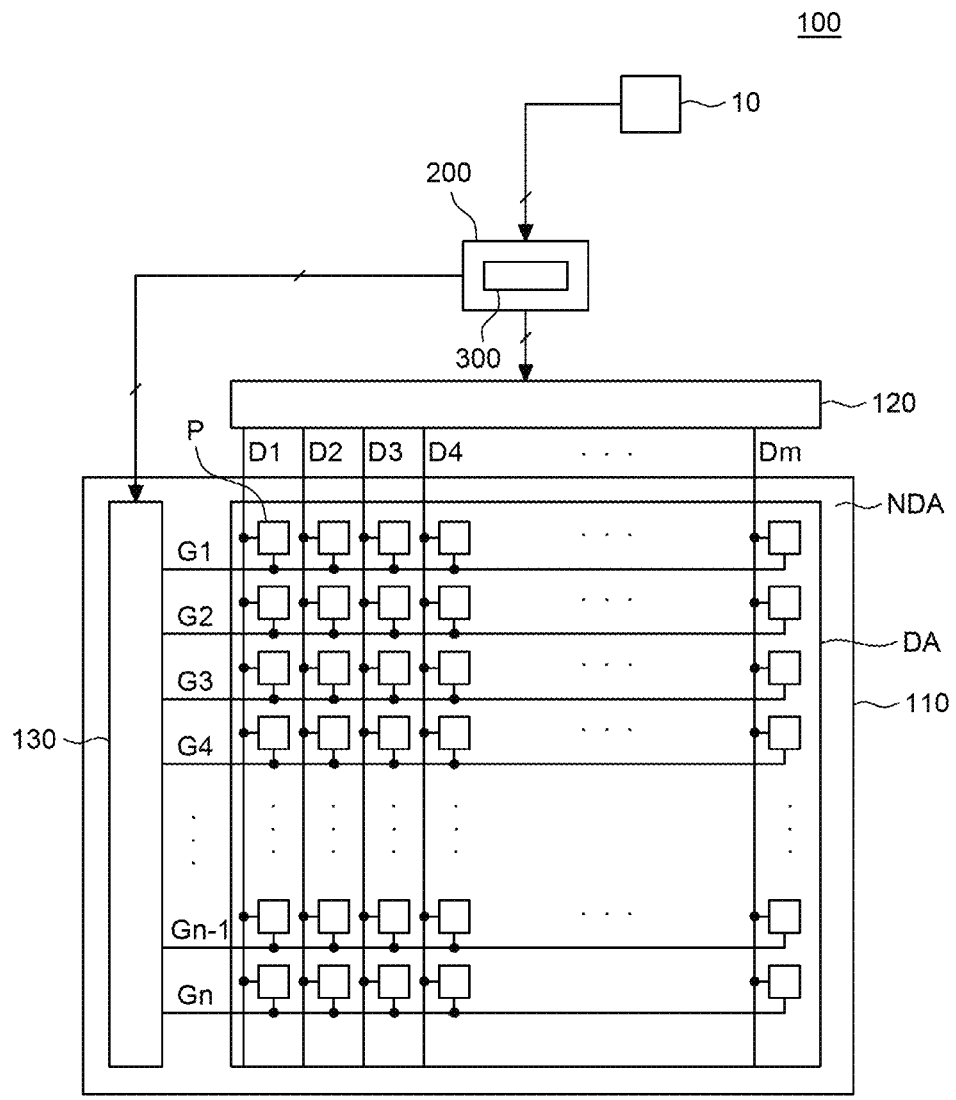
FIG. 1 is a schematic block diagram of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

The term "unit" may include any electrical circuitry, features, components, an assembly of electronic components or the like. That is, "unit" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "unit." In some embodiments, the various units described herein may be included in or otherwise implemented by processing circuitry such as a microprocessor, microcontroller, or the like.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a schematic block diagram of a display device according to an exemplary embodiment of the present disclosure. In FIG. 1, for the convenience of description, among various components of the display device 100, only a display panel 110, a data driver 120, a gate driver 130, a control board 200, a timing controller 300, and an external device 10 are illustrated.

Referring to FIG. 1, a display device 100 according to the exemplary embodiment of the present disclosure includes a display panel 110, a data driver 120, a gate driver 130, and a control board 200.

The display panel 110 is a panel for displaying images. The display panel 110 may include various circuits, wiring lines, and light emitting diodes disposed on the substrate. The display panel 110 may be divided by a plurality of data lines D1 to Dm and a plurality of gate lines G1 to Gn intersecting each other and may include a plurality of pixels P which is connected to the plurality of data lines D1 to Dm and the plurality of gate lines G1 to Gn. The display panel 110 may include a display area DA defined by a plurality of pixels P and a non-display area NDA in which various signal lines or pads are formed. The display panel 110 may be implemented by a display panel 110 used in various display devices such as a liquid crystal display device, an organic light emitting display device, or an electrophoretic display device. Hereinafter, it is described that the display panel 110 is a panel used for the organic light emitting display device, but is not limited thereto.

The data driver 120 supplies the data voltage to the plurality of pixels P. The data driver 120 may include a plurality of source drive ICs (integrated circuits). The plurality of source drive ICs may be supplied with image data and a source timing control signal from the timing controller 300. The plurality of source drive ICs may convert image data into a data voltage using a reference gamma voltage in response to a source timing control signal and supply the converted data voltage through the plurality of data lines D1 to DM of the display panel 110. The plurality of source drive ICs may be connected to the plurality of data lines D1 to Dm of the display panel 110 by a chip on glass (COG) process or a tape automated bonding (TAB) process. Further, the source drive ICs may be formed on the display panel 110 or may be formed on a separate PCB substrate to be connected to the display panel 110.

The gate driver 130 supplies the gate signal to the plurality of pixels P. The gate driver 130 may include a level shifter and a shift register. The level shifter may shift to a level of a clock signal input to a transistor-transistor-logic (TTL) level according to a gate timing control signal input from the timing controller 300 and then supply the clock signal to the shift register. The shift register may be formed in the non-display area of the display panel 110, by a gate in panel (GIP) manner, but is not limited thereto. The shift register may be configured by a plurality of stages which shifts the gate signal to output, in response to the clock signal and the driving signal. The plurality of stages included in the shift register may sequentially output the gate signal through a plurality of output terminals.

The panel controller 200 controls the display panel 110 with a signal received from the external device 10.

Figure 2:
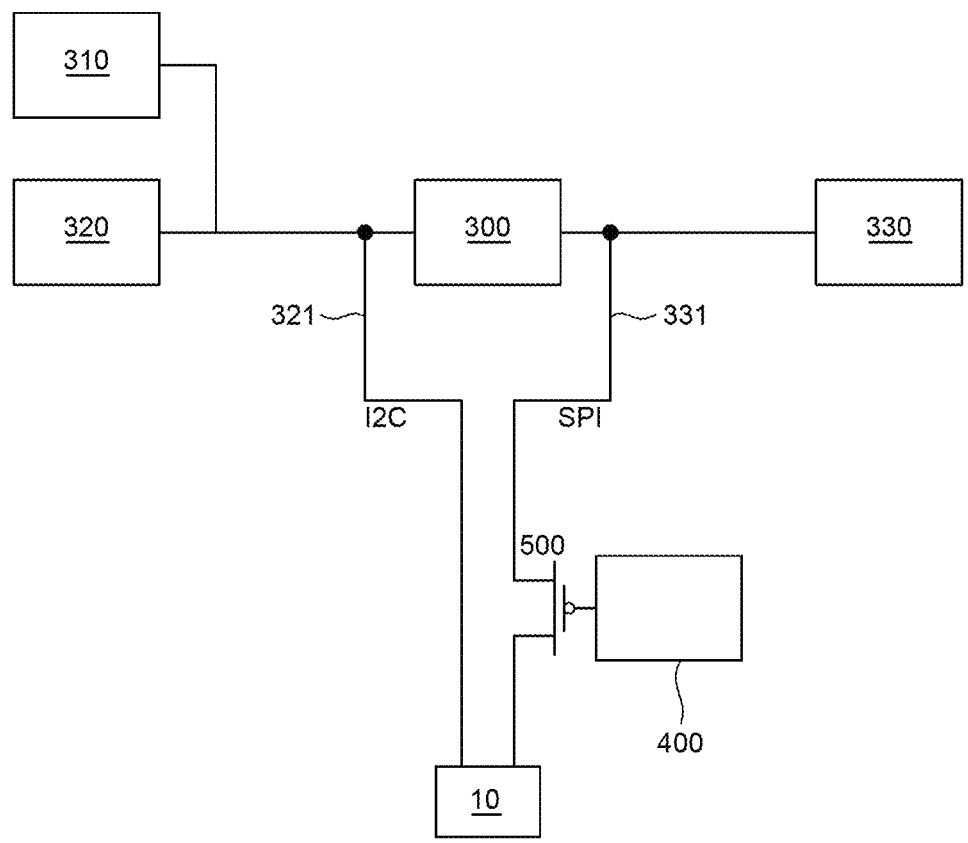
FIG. 2 is a block diagram illustrating a panel controller of a display device according to an exemplary embodiment of the present disclosure.

FIG. 2 is a block diagram illustrating a panel controller of a display device according to an exemplary embodiment of the present disclosure.

Referring to FIG. 2, the panel controller 200 includes a timing controller 300, a power management integrated circuit 310, a first memory 320, a second memory 330, and a line controller 400.

The timing controller 300 aligns image data input from the external device 10 to supply the image data to the data driver 120. The timing controller 300 may generate a gate timing control signal and a source timing control signal using synchronization signals input from the external device 10, such as a dot clock signal, a data enable signal, and horizontal/vertical synchronization signals. The timing controller 300 supplies the generated gate timing control signal and data timing control signal to the gate driver 130 and the data driver 120, respectively, to control the gate driver 130 and the data driver 120.

The power management integrated circuit 310 may control driving voltages required to drive the display device 100 and a driving voltage which drives the display panel 110, the data driver 120, and the gate driver 130 and supply various voltages or currents or control the supplied voltage or current. For example, the voltages may be a gate high voltage and a gate low voltage supplied to the gate driver 130, a gamma reference voltage supplied to the reference voltage generator, a common voltage supplied to the display panel 110, and the like.

In the first memory 320, data corresponding to driving voltages output from the power management integrated circuit 310 is stored in advance.

For example, the first memory 320 may start the operation by a signal input from the external device 10. The first memory 320 may supply data corresponding to the driving voltages controlled by the power management integrated circuit 310 to the power management integrated circuit 310 and the power management integrated circuit 310 may control a driving voltage corresponding to the data supplied from the first memory 320. The first memory 320 is a memory device in which data is stored even though the power is turned off. The first memory 320 may be an electrically erasable or programmable read-only memory (EEPROM).

The first communication line 321 is connected between the timing controller 300 and the first memory 320 and is connected to the external device 10.

For example, the timing controller 300 and the first memory 320 may be connected by an internal communication line and the first communication line 321 may be connected to the internal communication line between the timing controller 300 and the first memory 320. The first communication line 321 may be connected to the external device 10.

The first communication line 321 is an inter-integrated circuit (I2C) communication line. The I2C communication method is a bi-directional digital-serial communication method which provides a communication link between modules. According to the I2C communication method, the data communication is possible only with two bus lines which transmit serial data SDA and a serial clock SCL. In one exemplary embodiment of the present disclosure, the timing controller 300 may be a master and the first memory 320 may be a slave.

In the second memory 330, compensation data is stored. The compensation data is to compensate for a driving characteristic change of pixels P. For example, the timing controller 300 may control driving timings of the data driver 120 and the gate driver 130 to sense a driving characteristic of pixels P during a predetermined specific period and update compensation data for compensating for the driving characteristic change of the pixels P based on a sensing result and store the data in the second memory 330. The second memory 330 is a memory device in which data is stored even though the power is turned off and may be a flash memory.

The second communication line 331 is connected between the timing controller 300 and the second memory 330 and is connected to the external device 10.

For example, the timing controller 300 and the second memory 330 may be connected by an internal communication line and the second communication line 331 may be connected to the internal communication line between the timing controller 300 and the second memory 330. The second communication line 331 may be connected to the external device 10.

The second communication line 331 is a serial peripheral interface (SPI) communication line. The SPI communication method is a serial communication device or a serial communication method which allows a processor and a peripheral IC to communicate with each other. The SPI communication performs the communication with three lines of a serial clock (SCLK), slave-in (SI), and slave-out (SO). Further, the SPI communication supports communication between one master and one slave. In one exemplary embodiment of the present disclosure, the timing controller 300 may be a master and the second memory 330 may be a slave.

A switch 500 is connected to the second communication line 331 and the line controller 400 is connected to the switch 500.

The switch 500 is turned on/off according to a control signal output from the line controller 400 to connect the second communication line 331 or open the second communication line 331.

The line controller 400 controls whether to use the second communication line 331 depending on whether the first communication line 321 is used. A specific configuration of the line controller 400 will be described in more detail below with reference to the drawings.

Figure 3:
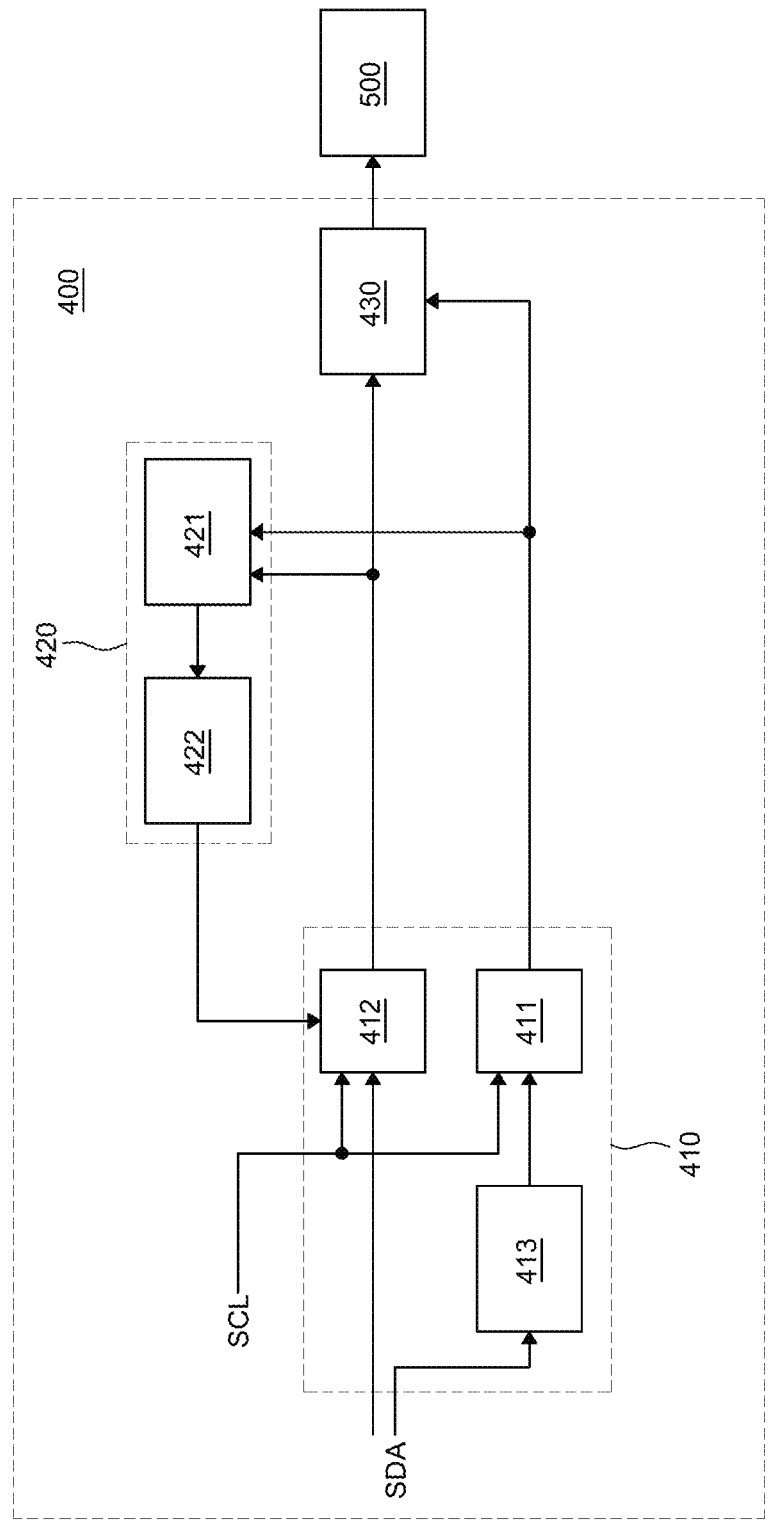
FIG. 3 is a block diagram illustrating a line controller and a switch of a display device according to an exemplary embodiment of the present disclosure.
Figure 4:
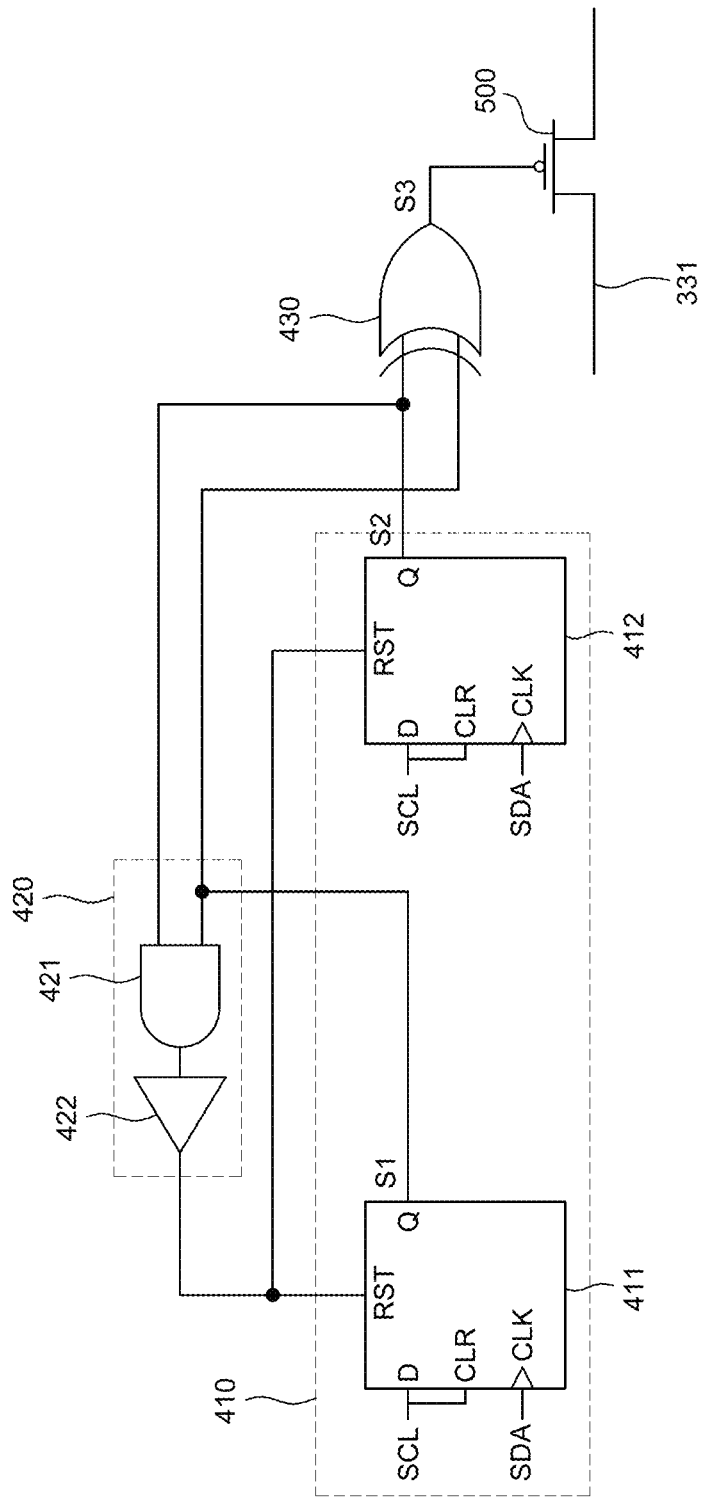
FIG. 4 is a circuit diagram illustrating a line controller and a switch of a display device according to an exemplary embodiment of the present disclosure.

FIG. 3 is a block diagram illustrating a line controller and a switch of a display device according to an exemplary embodiment of the present disclosure. FIG. 4 is a circuit diagram illustrating a line controller and a switch of a display device according to an exemplary embodiment of the present disclosure.

Referring to FIGS. 3 and 4, when it is determined that the first communication line 321 is in use, the line controller 400 outputs a control signal to turn off the switch 500. Therefore, the switch 500 is turned off by the control signal to open the second communication line 331 so that the data is not transmitted through the second communication line 331. In the meantime, when it is determined that the first communication line 321 is not in use, a control signal which turns on the switch 500 is output. Therefore, the switch 500 is turned on by the control signal to connect the second communication line 331 so that the data is transmitted using the second communication line 331. At this time, the line controller 400 determines whether the first communication line 321 is used based on a serial clock (SCL) signal and a serial data (SDA) signal transmitted through the first communication line 321. The line controller 400 includes a usage section determination circuit 410, an initialization circuit 420, and an output circuit 430.

The usage section determination circuit 410 determines a start section in which the use of the first communication line 321 begins to an end section in which the use of the first communication line 321 ends, based on the SCL signal and the SDA signal. The usage section determination circuit 410 determines a start section in which the use of the first communication line 321 begins based on the SCL signal and the SDA signal to output a start signal and determines an end section in which the use of the first communication line 321 ends to output an end signal. The SCL signal and the SDA signal transmitted between the timing controller 300 and the first memory 320 are input to the usage section determination circuit 410. The usage section determination circuit 410 outputs the start signal or the end signal depending on the voltage level of the input SCL signal and depending on whether the SDA signal is a rising edge or a falling edge.

Referring to FIG. 4, the usage section determination circuit 410 includes a first flip flop 411 and a second flip flop 412.

The first flip flop 411 outputs the start signal based on the SCL signal and the SDA signal. The SCL signal and the SDA signal transmitted between the timing controller 300 and the first memory 320 are input to the first flip flop 411. The first flip flop 411 determines a start section in which the use of the first communication line 321 begins according to the input SCL signal and SDA signal to output the start signal. For example, the first flip flop 411 may be an edge-triggered asynchronous flip flop. Therefore, when the SCL signal is a high level signal, the first flip flop 411 may output a high level of start signal only when the SDA signal is changed so that when the SCL signal is a high level signal, if the SDA signal is a falling edge, the first flip flop may output the high level of start signal.

The SCL signal may be input to an input pin D and a clear CLR pin of the first flip flop 411 and the SDA signal may be input to a CLK pin of the first flip flop 411. In this case, only when the SCL signal input to the input pin D is a high level, the first flip flop 411 may input the SDA signal to the CLK pin. Therefore, when the SCL signal is a high level signal, the first flip flop 411 may output the start signal according to an edge of the SDA signal. For example, when the SCL signal input to the input pin D of the first flip flop 411 is a high level signal and the SDA signal input to the CLK pin of the first flip flop 411 is a falling edge, the start signal may be output. Specifically, in a state in which the SCL signal input to the input pin D of the first flip flop 411 is a high level signal, at the moment when the SDA signal input to the CLK pin of the first flip flop 411 is a falling edge, the start signal which is a high level signal may be output.

Referring to FIG. 3, in the exemplary embodiment of the present disclosure, an inverter gate 413 is connected to the first flip flop 411. For example, the inverter gate 413 may be connected to the CLK pin of the first flip flop 411. In this case, an SDA signal which is inverted by the inverter gate 413 is input to the CLK pin of the first flip flop 411. Accordingly, the first flip flop 411 may use the same SDA signal as the second flip flop 412. Further, when a phase of the SDA signal input to the first flip flop 411 is changed to be different from that of the second flip flop 412, the first flip flop 411 may detect a start section which begins the use of the first communication line 321 and the second flip flop 412 may detect a section which ends the use of the first communication line 321. That is, both a timing when the use of the first communication line 321 begins and a timing when the use of the first communication line 321 ends may be detected.

Referring to FIG. 4, the second flip flop 412 outputs the end signal based on the SCL signal and the SDA signal. The SCL signal and the SDA signal transmitted between the timing controller 300 and the first memory 320 are input to the second flip flop 412. The second flip flop 412 determines an end section in which the use of the first communication line 321 ends according to the input SCL signal and SDA signal to output the end signal. For example, the second flip flop 412 may be an edge-triggered asynchronous flip flop. Therefore, when the SCL signal is a high level signal, the first flip flop 411 may output a high level of start signal only when the SDA signal is changed so that when the SCL signal is a high level signal, if the SDA signal is a rising edge, the first flip flop 411 may output the high level of end signal.

The SCL signal may be input to an input pin D and a CLR pin of the second flip flop 412 and the SDA signal may be input to a CLK pin of the second flip flop 412. In this case, only when the SCL signal input to the input pin D is a high level, the second flip flop 412 may input the SDA signal to the CLK pin. Therefore, when the SCL signal is a high level signal, the second flip flop 412 may output the end signal according to an edge of the SDA signal. For example, when the SCL signal input to the input pin D of the second flip flop 412 is a high level signal and the SDA signal input to the CLK pin of the second flip flop 412 is a rising edge, the end signal may be output. Specifically, in a state in which the SCL signal input to the input pin D of the second flip flop 412 is a high level signal, at the moment when the SDA signal input to the CLK pin of the second flip flop 412 is a rising edge, the end signal which is a high level signal may be output. However, the second flip flop 412 may output a low level signal at a remaining timing of the SCL signal and the SDA signal excluding a timing which is the moment when the SDA signal input to the CLK signal is a rising edge, in a state in which the input SCL signal is a high level signal.

Referring to FIGS. 3 and 4, when the start signal and the end signal are input, the initialization circuit 420 outputs an initialization signal which initializes the usage section determination circuit 410. The initialization circuit 420 includes an AND gate 421 and a buffer gate 422.

The AND gate 421 is connected to an output terminal of the first flip flop 411 and an output terminal of the second flip flop 412 to receive a start signal output from the first flip flop 411 and an end signal output from the second flip flop 412 to output an initialization signal which initializes the usage section determination circuit 410. For example, when a high level of start signal and a high level of end signal are input, the AND gate 421 may output a high level of initialization signal which initializes the first flip flop 411 and the second flip flop 412. However, when any one of the start signal or the end signal is a low level signal, the AND gate 421 may output a low level signal.

The buffer gate 422 outputs an initialization signal input from the AND gate 421. The buffer gate 422 outputs the initialization signal which is output from the AND signal 421 to be input to the usage section determination circuit 410 as it is which is not changed. The initialization signal which is output from the AND gate 421 may be attenuated or changed due to a resistance of a wiring line between the AND gate 421 and the usage section determination circuit 410. Therefore, the buffer gate 422 may input the initialization signal output from the AND gate 421 to reset pins RST of the first flip flop 411 and the second flip flop 412 without being attenuated or changed. Further, the buffer gate 422 may delay the initialization signal output from the AND gate 421 and then input the initialization signal to the reset pins RST of the first flip flop 411 and the second flip flop 412.

Referring to FIGS. 3 and 4, the output circuit 430 outputs a control signal according to the start signal and the end signal. The output circuit 430 outputs a control signal which controls the switch 500 connected to the second communication line 331 according to the start signal output from the first flip flop 411 and the end signal output from the second flip flop 412.

Referring to FIG. 4, the output circuit 430 includes or is an XOR gate.

When the start signal is input, the output circuit 430 outputs an output signal which disconnects the second communication line 331 and when the end signal is input, outputs an output signal which connects the second communication line 331. The output circuit 430 outputs an output signal which turns on or turns off the switch 500 according to the input start signal and end signal. At this time, the switch 500 may be a P type switch, but is not limited thereto. For example, when a high level of start signal is input and a low level of end signal is input, the output circuit 430 outputs a high level of output signal which turns off the switch 500. Further, when a low level of start signal is input and a high level of end signal is input, the output circuit 430 outputs a low level of output signal which turns on the switch 500.

Figure 5:
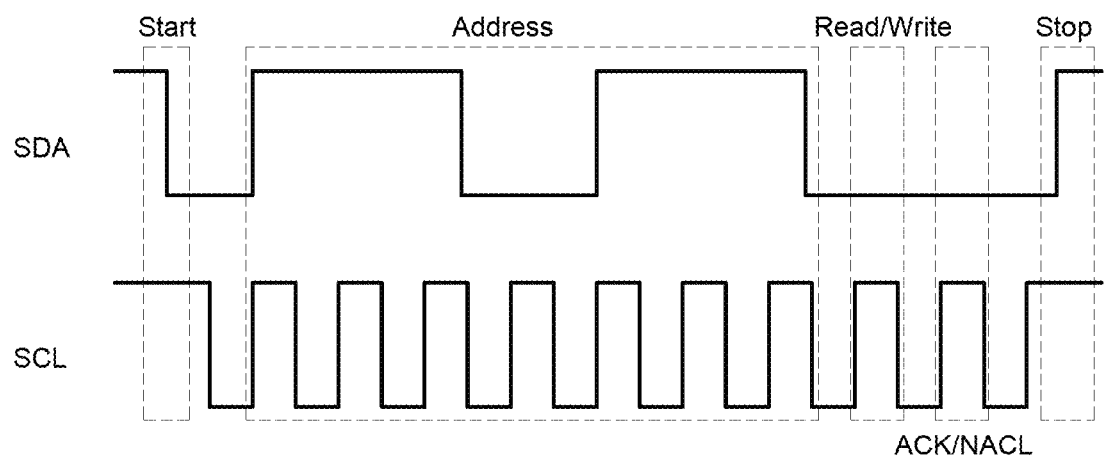
FIG. 5 is a waveform diagram illustrating waveforms of an SDA signal and an SCL signal.
Figure 6:
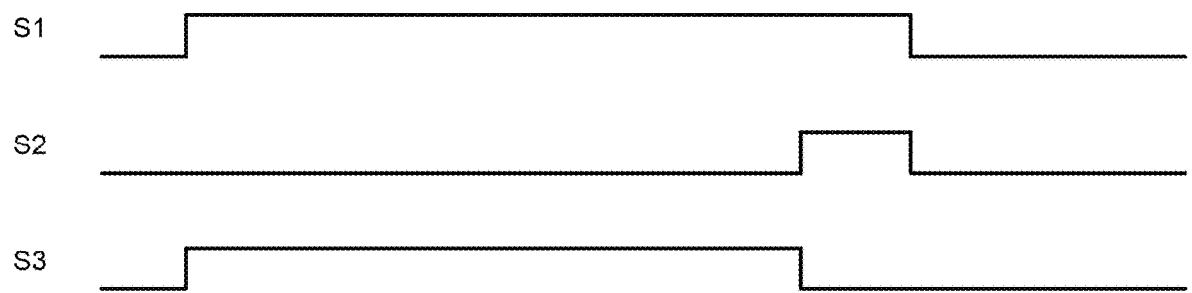
FIG. 6 is a waveform diagram illustrating a waveform of a signal output from a usage section determination circuit and an output circuit.

FIG. 5 is a waveform diagram illustrating waveforms of an SDA signal and an SCL signal. FIG. 6 is a waveform diagram illustrating a waveform of a signal output from a usage section determination circuit and an output circuit. FIG. 5 is a waveform diagram illustrating waveforms of the SDA signal and the SCL signal input to the first flip flop 411 and the second flip flop 412. In FIG. 6, S1 is a start signal output from the first flip flop 411, S2 is an end signal output from the second flip flop 412, and S3 is a control signal output from the output circuit 430.

Referring to FIGS. 5 and 6, initial values of the SCL signal and the SDA signal may start with a high level signal. In a state in which the SCL signal input to the first flip flop 411 is a high level signal, at a moment when the SDA signal input to the first flip flop 411 is a falling edge, the first flip flop 411 outputs the start signal S1 which is a high level signal. At this time, when a high level of start signal S1 is input and a low level of end signal S2 is input, the output circuit 430 outputs a high level of output signal S3 which turns off the switch 500.

Thereafter, in a state in which the SCL signal input to the second flip flop 412 is a high level signal, at a moment when the SDA signal input to the second flip flop 412 is a rising edge, the second flip flop 412 may output the end signal S2 which is a high level signal. At this time, in a state in which a high level of start signal S1 is input, when a high level of end signal S2 is input, the output circuit 430 outputs a low level of output signal which turns on the switch 500.

Accordingly, when a communication line is not used to compensate for a data voltage using a communication line connected to an external device 10 for pixel (P) compensation, the display device 100 according to the exemplary embodiment of the present disclosure opens the communication line. Therefore, a signal is not input through the communication line so that transmission of a wrong data voltage due to the external noise may be reduced or minimized. In the meantime, when the data voltage compensation is performed using a communication line connected to the external device 10 for pixel (P) compensation, even though the communication line connected to the external device 10 is not used, if a communication line connected to the external device 10 is connected to the communication line between the timing controller 300 and the second memory 330 with a T structure, a surrounding swinging signal operates as a noise. Therefore, when a data signal is consistently transmitted between the timing driver and the memory, there is a problem in that the data signal is changed so that a wrong data signal may be transmitted. In contrast, when it is determined that the first communication line 321 is used through the SCL signal and the SDA signal transmitted between the timing controller 300 and the first memory 320, the display device 100 according to the exemplary embodiment of the present disclosure opens the second communication line 331 which connects an internal communication line connected between the timing controller 300 and the second memory 330 and the external device 10. Therefore, when the second communication line 331 is not used, the signal is not input through the second communication line 331 so that the transmission of the wrong data voltage due to the external noise may be reduced or minimized.

Further, when the timing controller 300 uses an I2C communication line and an SPI communication line which are connected to the external device 10, if the I2C communication line is used, the display device 100 according to the exemplary embodiment of the present disclosure opens the SPI communication line to reduce or minimize the communication noise. In the meantime, when the I2C communication line connected to the external device 10 and the SPI communication line connected to the external device 10 are simultaneously used, there is a problem in that the noise is increased. In contrast, when the I2C communication line connected to the external device 10 is used, the display device 100 according to the exemplary embodiment of the present disclosure opens the SPI communication line connected to the external device 10 to use only one communication line connected to one external device 10. Accordingly, the noise may be reduced or minimized.

The exemplary embodiments of the present disclosure can also be described as follows:

A display device according to an exemplary embodiment of the present disclosure includes a display panel in which a plurality of pixels is disposed, a timing controller which generates and outputs control signals required to drive the display panel, a first communication line which is connected between the timing controller and a first memory and is connected to an external device, a second communication line which is connected between the timing controller and a second memory and is connected to the external device and a line controller which controls whether to use the second communication line depending on whether the first communication line is used.

The first communication line may be an inter-integrated circuit (I2C) communication line and the second communication line is a serial peripheral interface (SPI) communication line.

When it may be determined that the first communication line is in use, the line controller outputs a control signal which controls the second communication line not to be used and when it may be determined that the first communication line is not in use, the line controller outputs the control signal which controls the second communication line to be used.

The line controller may determine whether the first communication line is used based on a serial clock (SCL) signal and a serial data (SDA) signal transmitted between the timing controller and the first memory to output a control signal which controls whether to use the second communication line.

The line controller may include a usage section determination unit which determines a start section which starts use of the first communication line to output a start signal and determines an end section which ends the use of the first communication line to output an end signal, based on the SCL signal and the SDA signal, an initialization unit which outputs an initialization signal to initialize the usage section determination unit when the start signal and the end signal are input and an output unit which outputs the control signal which controls whether to use the second communication line according to the start signal and the end signal.

The usage section determination unit may include a first flip flop which outputs the start signal based on the SCL signal and the SDA signal and a second flip flop which outputs the end signal based on the SCL signal and the SDA signal.

When the SCL signal is input to an input pin and a CLR pin of the first flip flop, the SCL signal input to the first flip flop is a high level signal, and the SDA signal is a falling edge, the usage section determination unit may outputs the start signal and when the SCL signal which is input to the second flip flop is a high level signal and the SDA signal is a rising edge, may outputs the end signal.

The usage section determination unit may further include an inverter gate connected to the first flip flop.

When the SCL signal input to the first flip flop is the high level signal, and the SDA signal is the falling edge, the usage section determination unit may outputs the start signal.

The initialization unit may include an AND gate which outputs the initialization signal when the start signal and the end signal are input.

The initialization unit may further include a buffer gate which is connected to the AND gate to output the initialization signal to the usage section determination unit.

The output unit may output the control signal to disconnect the second communication line when the start signal is input and may output the control signal to connect the second communication line when the end signal is input.

The output unit may be an XOR gate.

The display device may further include a switch connected to the second communication line, wherein the switch is turned on/off according to the control signal output from the output unit.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a display panel in which a plurality of pixels is disposed;
a timing controller configured to generate and output control signals for driving the display panel;
a first communication line which is electrically connected between the timing controller and a first memory and is electrically connected to an external device;
a second communication line which is electrically connected between the timing controller and a second memory and is electrically connected to the external device;
a line controller configured to control whether to use the second communication line based on whether the first communication line is used; and
a switch electrically connected to the second communication line,
wherein the line controller turned off the switch when determining that the first communication line is in use and the switch disconnected the second communication line,
wherein the line controller determines whether the first communication line is used based on a serial clock signal and a serial data signal transmitted between the timing controller and the first memory to output a control signal which controls whether to use the second communication line,
wherein the line controller includes:
a usage section determination circuit which determines a start section which starts use of the first communication line to output a start signal and determines an end section which ends the use of the first communication line to output an end signal, based on the serial clock signal and the serial data signal;
an initialization circuit which outputs an initialization signal to initialize the usage section determination circuit when the start signal and the end signal are input; and
an output circuit which outputs the control signal which controls whether to use the second communication line according to the start signal and the end signal,
wherein the output circuit outputs the control signal to disconnect the second communication line when the start signal of high level and the end signal of low level is input and outputs the control signal to electrically connect the second communication line when the start signal of high level and the end signal of high level is input.

2. The display device according to claim 1, wherein the first communication line is an inter-integrated circuit communication line and the second communication line is a serial peripheral interface communication line.

3. The display device according to claim 1, wherein:
when it is determined that the first communication line is in use, the line controller outputs the control signal which controls the second communication line not to be used, and
when it is determined that the first communication line is not in use, the line controller outputs the control signal which controls the second communication line to be used.

4. The display device according to claim 1, wherein the usage section determination circuit includes:
a first flip flop configured to output the start signal based on the serial clock signal and the serial data signal; and a second flip flop configured to output the end signal based on the serial clock signal and the serial data signal.

5. The display device according to claim 4, wherein when the serial clock signal is input to an input pin and a clear pin of the first flip flop, the serial clock signal input to the first flip flop is a high level signal, and the serial data signal is a falling edge, the usage section determination circuit outputs the start signal and when the serial clock signal which is input to the second flip flop is a high level signal and the serial data signal is a rising edge, outputs the end signal.

6. The display device according to claim 5, wherein the usage section determination circuit further includes an inverter gate electrically connected to the first flip flop.

7. The display device according to claim 4, wherein when the serial clock signal input to the first flip flop is the high level signal, and the serial data signal is the falling edge, the usage section determination circuit outputs the start signal.

8. The display device according to claim 1, wherein the initialization circuit includes an AND gate which outputs the initialization signal when the start signal and the end signal are input.

9. The display device according to claim 8, wherein the initialization circuit further includes a buffer gate which is electrically connected to the AND gate to output the initialization signal to the usage section determination circuit.

10. The display device according to claim 1, wherein the output circuit is an XOR gate.

11. The display device according to claim 1,
wherein the switch is turned on/off according to the control signal output from the output circuit.

12. A display device, comprising:
a display panel;
a timing controller configured to generate a control signal for driving the display panel;
a first communication line via which the timing controller is electrically connected with an external device;
a switch;
a second communication line via which and the switch the timing controller is also electrically connected with the external device; and
a line controller configured to, when determining that the first communication line is in use, output a control signal to the switch such that the switch is turned off,
wherein the line controller is configured to turn off the switch when determining that the first communication line is in use and disconnect the switch from the second communication line,
wherein the line controller determines whether the first communication line is used based on a serial clock signal and a serial data signal transmitted between the timing controller and the external device to output a control signal which controls whether to use the second communication line,
wherein the line controller includes:
a usage section determination circuit which determines a start section which starts use of the first communication line to output a start signal and determines an end section which ends the use of the first communication line to output an end signal, based on the serial clock signal and the serial data signal;
an initialization circuit which outputs an initialization signal to initialize the usage section determination circuit when the start signal and the end signal are input; and
an output circuit which outputs the control signal which controls whether to use the second communication line according to the start signal and the end signal,
wherein the output circuit outputs the control signal to disconnect the second communication line when the start signal of high level and the end signal of low level is input and outputs the control signal to electrically connect the second communication line when the start signal of high level and the end signal of high level is input.

* * * * *